United States Patent
Addonizio, Jr. et al.

[11] Patent Number: 5,957,123
[45] Date of Patent: Sep. 28, 1999

[54] REINFORCED COOKING PAN AND SKIRT ASSEMBLY

[75] Inventors: Nicholas Addonizio, Jr.; Peter Castrichini, both of Peabody, Mass.

[73] Assignee: Market Forge Industries, Inc., Everett, Mass.

[21] Appl. No.: 09/170,293

[22] Filed: Oct. 13, 1998

[51] Int. Cl.⁶ .................................................. A47J 27/00
[52] U.S. Cl. ........................ 126/390; 126/373; 126/266; 126/265; 99/422; 99/DIG. 15
[58] Field of Search .................... 126/390, 373, 126/266, 265, 262; 99/422, DIG. 15

[56] References Cited

U.S. PATENT DOCUMENTS

| | | | |
|---|---|---|---|
| 1,201,138 | 10/1916 | Bingham | 99/422 |
| 2,572,826 | 10/1951 | Shaw, Jr. | 126/265 |
| 5,357,850 | 10/1994 | Coudurier | 99/422 |

*Primary Examiner*—Larry Jones
*Attorney, Agent, or Firm*—Michael Ebert

[57] ABSTRACT

A generally rectangular metal cooking pan and skirt assembly in which the pan is mounted above the skirt and is joined thereto. Disposed within the skirt is a gas or electric heating unit which generates heat that is applied to the pan to cook meat or other food placed therein. Because of thermal stresses created in the pan by the applied heat in the course of a cooking operation, the pan is susceptible to warpage and possible damage. To constrain such warpage there is provided a reinforcing bar extending diagonally across the rectangular skirt and being welded at its end to opposing diagonal corners of the skirt. The diagonal bar defines a constraining bridge that maintains the geometry of the assembly in the course of a cooking operation to prevent it from exceeding its elastic limit and permanently deforming the assembly.

8 Claims, 1 Drawing Sheet

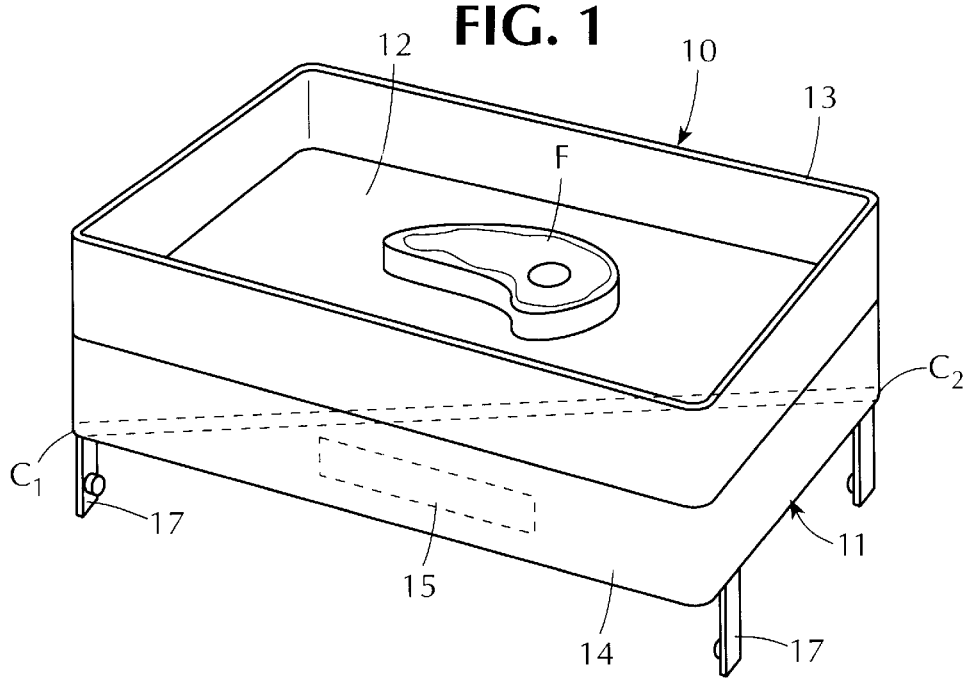
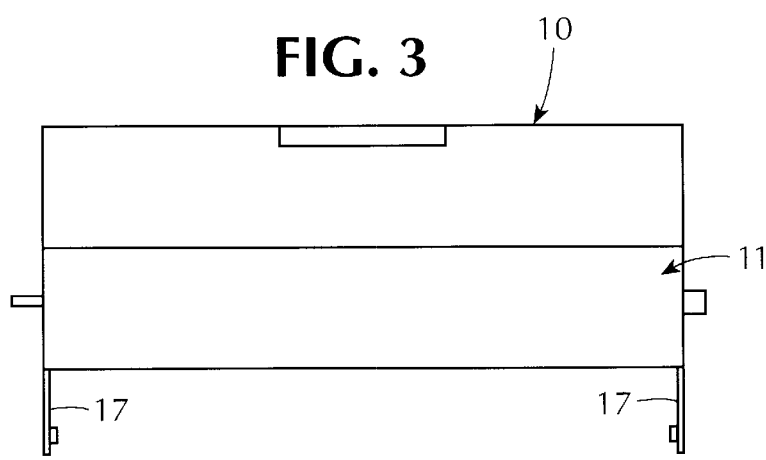
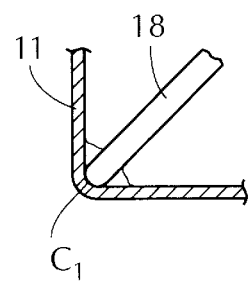
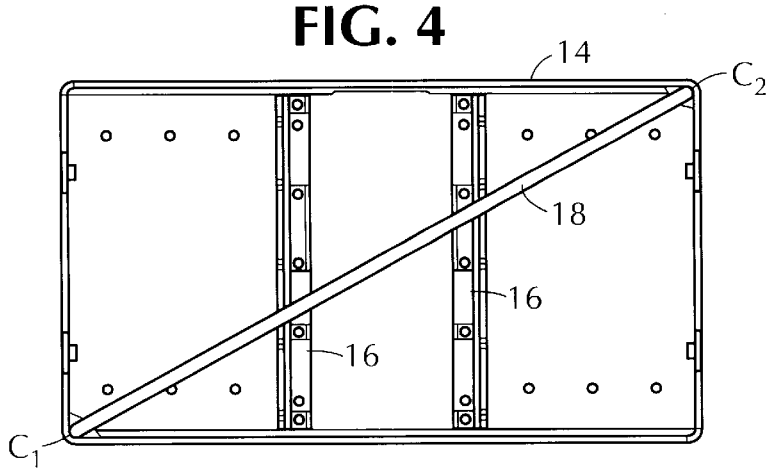

REINFORCED COOKING PAN AND SKIRT ASSEMBLY

BACKGROUND OF INVENTION

1. Field of Invention

This invention relates generally to a metal cooking pan and skirt assembly in which a heating unit within the skirt provides heat to cook food placed in the pan, and more particularly to an assembly of this type that includes means to constrain warpage of the assembly in the course of cooking and possible damage thereto.

2. Status of Prior Art

The coefficient of thermal expansion of any metal is the increment of a unit of length for a rise in temperature of one degree Fahrenheit. Hence a metallic structure will expand and contract as the temperature to which the structure is subjected rises and declines. The degree of expansion and contraction depends on the nature of the metal, for some metals have a relatively low coefficient of expansion while others have a higher coefficient.

Thermal stress is mechanical stress induced in a structure when not all of its parts are free to expand or contract to an equal degree in response to thermal changes. In most continuous structures, expansion and contraction cannot occur freely in all directions because of its geometry, various constraints and the existence of temperature gradients. Where the structure is a cooking utensil, thermal stresses produced in the course of heating may permanently deform and damage the utensil.

The reason for such deformation is that the thermal stresses produced in the course of a cooking operation cause the utensil to warp or twist, and if the stresses exceed the elastic limit of the metal, then the utensil will become permanently deformed. By definition, the elastic limit is the maximum stress a solid can sustain without undergoing permanent deformation.

The concern of the present invention is with a metallic structure that includes a rectangular skillet or pan for cooking or braising meat or other foods. In a known structure of this type, the rectangular pan is mounted above a skirt within which is disposed a gas or electric heating unit which applies heat to the base of the pan.

In the course of a cooking operation, the rectangular metal pan will be subjected to thermal stresses that may so warp and distort its structure as to permanently damage the pan. It is known to provide a pan of this type which is resistant to warpage. In this pan the working surface or base to which heat is applied takes the form of a thick steel plate that is welded to a thinner metal shell, the plate having a thickness of greater than a half inch. This steel plate, though resistant to warpage, makes the pan heavy and bulky, and also makes it difficult to handle.

Moreover, while heat is normally transferred from the plate at the base of the pan to meat or food resting on the plate, in some cases, particularly in a busy restaurant or hotel kitchen, the pan may inadvertently be heated for a prolonged period without there being in the pan any meat or food to absorb the heat. In that event, the base of the pan becomes overheated and the resultant warpage may irreparably damage the pan.

As pointed out in the Coudeurier U.S. Pat. No. 5,357,850, when the base of a frying pan is exposed to intense heat, the pan tends to warp. But while one could reduce the extent of such warpage by using a thicker metal for the base, this not only increases the cost of the pan but it also lengthens the cooking time, for a thick metal base reduces the rate of heat transfer to the food placed in the pan.

In Coudeurier, in order to prevent warpage, the base of the pan is formed by an array of radial grooves running from the center to the periphery of the pan to resist deformation of the base when it is subjected to intense heat.

In the Levin U.S. Pat. No. 3,045,664, to resist warpage of a cooking pot at elevated temperatures, the pot is provided at its bottom with a composite disc formed of a sheet of copper and a sheet of aluminum. In Faulk U.S. Pat. No. 1,730,030, the cooking utensil is provided with a base which is a laminate of aluminum and a dissimilar metal, such as iron or nickel, to prevent the utensil from warping. And in Bringham U.S. Pat. No. 1,201,138, a circular griddle is provided with spiral ribs at its base to strengthen the griddle and prevent warping thereof.

SUMMARY OF INVENTION

In view of the foregoing, the main object of this invention is to provide a metal cooking pan and skirt assembly in which a heating unit disposed within the pan acts to apply heat to the base of the pan to cook food placed therein, the assembly including reinforcing means to constrain warpage of the assembly in the course of cooking and prevent damage thereto.

Among the significant aspects of an assembly in accordance with the invention are the following:

A. The means to constrain warpage of the assembly is effective even when no food is placed in the pan to absorb the heat whereby the pan is subjected to intense heat which seeks to deform the assembly.

B. The means to constrain the assembly is integrated with the assembly which in all other respects can be a standard assembly having a gas or electrical heating unit: hence these means do not significantly raise the cost of manufacturing the assembly.

C. The means to constraint the assembly is constituted by a metal bar which bridges opposing diagonal corners of the skirt and acts to maintain the geometry of the assembly.

D. The metal bar has a rectangular cross section which causes it to resist torsional stresses produced in the assembly which seek to twist the bar, the bar acting to prevent any portion of the structure from exceeding its elastic limit in the course of cooking.

Briefly stated, these objects are attained by a generally rectangular metal cooking pan and skirt assembly in which the pan is mounted above the skirt and is joined thereto. Disposed within the skirt is a gas or electric heating unit which generates heat that is applied to the pan to cook meat or other food placed therein. Because of thermal stresses created in the pan by the applied heat in the course of a cooking operation, the pan is susceptible to warpage and possible damage.

To constrain such warpage there is provided a reinforcing bar having the same thermal coefficient of linear expansion as that of the metal forming the assembly, the bar extending diagonally across the rectangular skirt and being welded at its end to opposing diagonal corners of the skirt. The diagonal bar defines a constraining bridge that maintains the geometry of the assembly in the course of a cooking operation to prevent it from exceeding its elastic limit and permanently deforming the assembly.

BRIEF DESCRIPTION OF DRAWING

For a better understanding of the invention as well as other objects and further features thereof, reference is made to the following detailed description to be read in conjunction with the accompanying drawings, wherein:

FIG. 1 schematically illustrates a cooking pan and skirt assembly in accordance with the invention;

FIG. 2 shows one diagonal corner of the skirt and one end of the reinforced bar welded thereto;

FIG. 3 is a side elevational view of the assembly; and

FIG. 4 is a plan view of the underside of the skirt.

DESCRIPTION OF INVENTION

Referring now to the drawings, FIG. 1, schematically illustrates a cooking pan and skirt assembly in accordance with the invention that includes a rectangular metal pan 10 mounted directly above a rectangular metal skirt 11 having the same rectangular dimensions, the pan being welded or otherwise joined to the skirt. The pan and skirt are fabricated of the same metallic material having good thermal conduction properties, such as stainless steel.

Pan 10 is formed by a rectangular base plate 12 acting as the cooking surface of the pan on which is placed meat or other food F to be cooked, plate 12 being joined at its periphery to a rectangular shell 13. Skirt 11 is formed by a rectangular shell 14 where dimensions correspond to those of shell 13 of the pan. Disposed within skirt 11 is an electrical or gas heating unit represented by block 15, the unit being of any known type. The controls for this unit (not shown), are mounted on skirt 11.

When heating unit 15 is of the electrical type, then as shown in FIG. 4 it is composed of a parallel array of electrical resistance elements 16, only two of which are shown in this figure. Skirt 11, as shown in FIG. 3 is provided with legs 17 to raise the assembly above the table or other surface on which it is placed.

Because both pan 10 and skirt 11 are fabricated of the same metal and exhibit the same thermal coefficient of expansion, they are subjected to similar thermal stresses in the course of a cooking operation. These thermal stresses seek to warp, twist and otherwise deform the structure of the assembly. As pointed out previously, if the maximum stress which is produced exceeds the elastic limit of the structure of the assembly or any portion thereof, such as the pan, then the resultant deformation of the structure will be permanent and irreparable.

The possibility of permanent deformation is greatest when due to inadvertence, the heat is turned on but no food is placed in the pan to absorb the heat, in which event virtually all of the heat is absorbed by base plate 12 of the pan which is then grossly overheated.

In order to constrain the structure of the assembly and substantially maintain the geometry of the assembly in the course of a cooking operation, reinforcing means are provided in the form of a metal bar 18 having a rectangular crossection to resist torsional forces which seek to twist the structure of the assembly.

The length of bar 18 is such that it extends diagonally between opposing diagonal corners $C_1$ and $C_2$ of rectangular shell 14 of skirt 11. The ends of bar 18 are welded to these corners so that it is integrated with the structure to define a constraining bridge that substantially maintain the geometry of the assembly the course of a cooking operation which acts to expand the metal from which the assembly is formed and to subject the structure to thermal stresses.

Bar 18 is formed of the same metal as that from which the assembly is fabricated, such as stainless steel; hence it exhibit the same coefficient of thermal expansion and no differential stresses are produced between the bar and the assembly.

While bar 18 is illustrated as being joined to shell 14 at its lower end, in practice it may be joined to shell 14 just below base 12 of the pan. Bar 18 does not resist thermal expansion of the assembly in the course of a cooking operation, for it is formed of the same metal. The function of bar 18 is to maintain the basic geometry of the assembly in the course of a cooking operation and to constrain warpage and deformation thereof so that it does not exceed the elastic limit of the metallic structure, which if unconstrained would result in a permanent deformation of the assembly.

While there has been shown a preferred embodiment of a reinforced cooking pan and skirt assembly in accordance with the invention, it is to be understood that many changes may be made therein without departing from the spirit of the invention.

We claim:

1. A cooking pan and skirt assembly comprising:

A. a rectangular metal pan having a base on which is placeable food to be cooked, and a rectangular shell joined to the base to surround the food;

B. a metal skirt underlying the pan and joined thereto, said skirt being defined by a rectangular shell having rectangular dimension corresponding to those of the pan shell;

C. a heating unit disposed within the skirt to apply heat to the base of the pan to cook the food therein; and D. reinforcing means bridging opposing diagonal corners of the shell of the skirt to maintain the geometry of the assembly in the course of a cooking operation and to constrain warpage thereof to prevent permanent deformation thereof, said reinforcing means being a metal bar whose ends are welded to said corners.

2. An assembly as set forth in claim 1, in which said bar, said pan and said skirt are formed of the same metal and therefore have the same coefficient of thermal expansion.

3. An assembly as set forth in claim 2, in which said metal is stainless steel.

4. An assembly as set forth in claim 1, in which said metal bar has a rectangular cross section to resist torsional forces.

5. An assembly as set forth in claim 1, in which the heating unit is a gas unit.

6. An assembly as set forth in claim 1, in which the heating unit is an electrical unit.

7. An assembly as set forth in claim 1, in which the metal bar is welded to the corners of the shell of the skirt adjacent its lower end.

8. An assembly as set forth in claim 1, in which the metal bar is welded to the corners of the shell of the skirt adjacent its end farther from the bottom of the pan.

* * * * *